United States Patent [19]
Mochizuki et al.

[11] Patent Number: 5,942,273
[45] Date of Patent: Aug. 24, 1999

[54] METHOD OF PREPARING PELLETS FOR SNACK CONFECTIONERY AND AN EXPANDED SNACK CONFECTIONERY

[75] Inventors: Keizo Mochizuki; Kyoko Tsuchidate, both of Saitama; Eiichi Kurokawa, Shizuoka, all of Japan

[73] Assignees: Meiji Seika Kaisha, Ltd.; Toshiba Machine Co., Ltd., both of Tokyo, Japan

[21] Appl. No.: 08/709,572

[22] Filed: Sep. 6, 1996

[30] Foreign Application Priority Data

Sep. 7, 1995 [JP] Japan ................................ 7-229924

[51] Int. Cl.$^6$ .................................................. A21D 13/00
[52] U.S. Cl. ........................... 426/549; 426/94; 426/559; 426/560; 426/618; 426/621; 426/808
[58] Field of Search ................................. 426/549, 560, 426/559, 618, 621, 808, 94

[56] References Cited

U.S. PATENT DOCUMENTS

| | | | |
|---|---|---|---|
| 2,954,295 | 9/1960 | Clausi et al. | 426/559 |
| 3,753,735 | 8/1973 | Gerkens | 426/559 |
| 3,800,050 | 3/1974 | Popel | 426/559 |
| 4,844,937 | 7/1989 | Wilkinson et al. | 426/559 |
| 4,965,981 | 10/1990 | Lazarus | 426/559 |
| 5,108,772 | 4/1992 | Wilbur | 426/559 |

*Primary Examiner*—Lien Tran
*Attorney, Agent, or Firm*—Nikaido, Marmelstein, Murray & Oram LLP

[57] ABSTRACT

There are provided a method of preparing pellets for a snack confectionery and an expanded snack confectionery by using the pellets. A dough for the pellets contains corn flour and potato starch. The pellets are thermally treated by using a home-type hair dryer to make those into the expanded snack confectionery.

5 Claims, No Drawings

METHOD OF PREPARING PELLETS FOR SNACK CONFECTIONERY AND AN EXPANDED SNACK CONFECTIONERY

BACKGROUND OF THE INVENTION

1. Field of the Invention

The present invention relates to a method of preparing pellets for snack confectionery and an expanded snack confectionery by using the pellets. The pellets can be expanded to make those into a final product of the snack confectionery, in a home by small amount and without through any frying operation.

2. Related Art

As a method of preparing an expanded snack confectionery with easy operation in a home, there is the method of obtaining popcorn snack, which comprises a step of heating popcorns by using a frying pan or microwave oven to cause explosive expansion of the popcorns.

There is also such a method that small rice-cake cubes are deep fried in an edible oil to cause expansion thereof.

However, there is no method of preparing an expanded snack confectionery in a home by using pellets of a dough for snack confectionery and without through any frying operation.

SUMMARY OF THE INVENTION

Therefore, one of the objects of the invention is to provide a method of preparing pellets for snack confectionery, which can be expanded in a home with easy operation and without through any frying operation.

Another object of the invention is to provide a method of preparing an expanded snack confectionery by using such pellets to allow the preparation of such expanded snack confectionery by small amount in a home.

For attaining the objects, the inventors have energetically studied and investigated to find that pellets for snack confectionery can be expanded by using a home-type hair dryer, if a composition of dough for the pellets is so adjusted that a time required for the expansion shall be made somewhat longer.

According to the invention, the first object can be attained by a method of preparing pellets for snack confectionery, which comprises steps of cooking raw materials of corn flour of 70–80 parts by weight, potato starch of 30–20 parts by weight, table salt, oil or fat and sucrose; forming a resulting cooked dough into a sheet; cutting the sheet into small pieces; and drying the pieces.

The second object can be attained by heating the pellets obtained by the method described in the preceding paragraph to cause expansion thereof.

It is preferable to use the table salt, oil or fat and sucrose in amounts of 0.5, 2–3 and 6–10 parts by weight, respectively, when total amount of the corn flour and potato starch is made as 100 parts by weight.

DESCRIPTION OF THE PREFERRED EMBODIMENTS

The invention will now be further explained in more detail with reference to Test Examples and Manufacturing Examples.

TEST EXAMPLE 1

An expansion ratio of pellets for snack confectionery depends on a mixing ratio of corn flour and potato starch.

Therefore, various dough different in composing ratio of corn flour and potato starch were prepared. Each of the doughs was cooked by a double-screwed extruder type cooker. The cooked dough was passed between a pair of rolls to obtain a sheet which was cut into small pieces, dried by hot air, and treated by an expanding machine (marketed by Arakawa Tekkou Co., Ltd. of Japan) for 40 seconds at 220° C. Each of resulting expanded snack confectioneries was subjected to a sensory test.

Results are shown in following Table 1.

TABLE 1

| Corn flour (parts by weight) | Potato starch (parts by weight) | Ratio of expansion | Possibility of production | Taste |
| --- | --- | --- | --- | --- |
| 65 | 35 | 9.3 | Difficulty (too sticky) | Good |
| 70 | 30 | 8.5 | Possible | Good |
| 80 | 20 | 7.0 | Possible | Good |
| 85 | 15 | 4.3 | Possible | No good |

In Table 1, the ratio of expansion has been shown by a product value of length, thickness and width of the expanded good to a product value of those of the pellet.

From the results shown in Table 1, it can be said that in case of the dough containing corn flour of 65 parts by weight and potato starch of 35 parts by weight, it is too sticky to cause adhesion to rolls and cutter and thus workability is bad to make the production of pellets difficult, that in case of the dough containing corn flour of 85 parts by weight and potato starch of 15 parts by weight, the pellets can be obtained without any trouble in operation, but the ratio of expansion decreases to 4.3, which means the expanded product is too hard and decreases in taste, that if the ratio of expansion is less than 7.0, tooth-feeling of "saku-saku" (one of imitation sounds) inherent to expanded snack confectioneries cannot be obtained, and that therefore, it is preferable to set the amount ratio of corn flour and potato starch to 70–80:30–20 in parts by weight.

TEST EXAMPLE 2

Although the expansion characteristic of the pellets depends on an amount of the potato starch to be composed, heat supplying capacity of a home-type hair dryer is not large, so that there is such a fear that if heat is supplied from the hair dryer to surface of pellets, the surface of pellets may solidify prior to thermal expansion thereof, whereby completely expanded products can not be obtained.

To clear this problem, it is preferable to compose sucrose in the dough. Therefore, the relation between an amount of sucrose and ratio of expansion was checked. In this case, all of doughs were prepared by 70 parts by weight of corn flour, 30 parts by weight of potato starch and sucrose, and a home-type hair dryer (100V, 1000 watts) manufactured by Toshiba Electric Co., Ltd. of Japan was selected.

Results are shown in following Table 2.

TABLE 2

| Amount of sucrose (parts by weight) | Ratio of expansion |
| --- | --- |
| 5 | 4.5 |
| 6 | 6.9 |
| 7 | 7.0 |

TABLE 2-continued

| Amount of sucrose (parts by weight) | Ratio of expansion |
| --- | --- |
| 8 | 7.0 |
| 9 | 7.1 |
| 10 | 7.2 |
| 11 | 7.2 |

As apparently seen from Table 2, the ratio of expansion cannot be improved, when the sucrose is composed in an amount less than 6 parts by weight to 100 parts by weight in total amount of the corn flour and potato starch. Even if the sucrose is composed in an amount more than 10 parts by weight, there is no problem in expansion of the pellets, but sweetness of the products increases, so that such products are not suitable as so-called a "savory-type snack confectionery".

Therefore, it is preferable to compose the sucrose in an amount of 6–10 parts by weight to 100 parts by weight in total amount of the corn flour and potato starch.

Manufacturing Example 1

Raw materials of corn flour (70 parts by weight), potato starch (30 parts by weight), table salt (0.5 parts by weight), vegetable oil (2 parts by weight) and sucrose (8 parts by weight) were homogeneously mixed and then preparing water (50 parts by weight) was added thereto to sufficiently mix the same for preparing a dough. The dough was charged into a double-screwed type cooking extruder (manufactured by Kurimoto Tekkou Co., Ltd. Japan).

Resulting cooked dough was formed into a sheet by charging the same between a pair of rolls with a mesh pattern on each outer surface thereof. The sheet-shaped dough was placed on another sheet-shaped dough. The double-layered sheet was cut into pieces by a rotary cutter and circular cutter. The pieces were dried by hot air at 80° C. to obtain dried snack pellets with moisture content of 11% by weight.

10 Dried pellets were put in a stainless-steel pan to supply hot air thereto for 30 seconds by a home-type hair dryer [manufactured by Ishizaki Electric Co., Ltd. of Japan, "Pra-jet PJ214A" (Trademark), 100V, 1020 watts] to obtain an expanded snack confectionery (ratio of expansion: 7).

The resulting products showed nice tooth-feeling or taste of "saku-saku" (imitation sound).

Manufacturing Example 2

Raw materials of corn flour (80 parts by weight), potato starch (20 parts by weight), table salt (0.5 parts by weight), vegetable oil (3 parts by weight) and sucrose (10 parts by weight) were homogeneously mixed and then preparing water (50 parts by weight) was added thereto to sufficiently mix the same for preparing a dough. The dough was charged into a double-screwed type cooking extruder (manufactured by Kurimoto Tekkou Co., Ltd. of Japan).

Resulting cooked dough was treated as in Manufacturing Example 1 to obtain dried snack pellets.

The pellets were expanded by the hair dryer employed in Manufacturing Example 1 to obtain an expanded snack confectionery (ratio of expansion: 7.2).

The resulting products showed nice tooth-feeling or taste of "saku-saku" (imitation sound).

What is caimed is:

1. A method of preparing pellets for snack confectionery, which comprises steps of cooking raw materials of corn flour of 70–80 parts by weight, potato starch of 30–20 parts, table salt, oil or fat and sucrose to prepare a cooked dough, forming ard cutting the cooked dough into pieces, and drying the pieces.

2. A method as claimed in claim 1, wherein an amount of said sucrose is 6–10 parts by weight based on 100 parts by weight in total amount of said corn flour and potato starch.

3. A method of preparing an expanded snack confectionery, which comprises steps of cooking raw materials of corn flour of 70–80 parts by weight, potato starch of 30–20 parts, table salt, oil or fat and sucrose to prepare a cooked dough, forming and cutting the cooked dough into pieces, drying the pieces, and then heating the pieces to cause expansion thereof.

4. A method as claimed in claim 3, wherein an amount of said sucrose is 6–10 parts by weight based on 100 parts by weight in total amount of said corn flour and potato starch.

5. A method as claimed in claim 3, wherein said heating step is carried out by using a hair dryer.

* * * * *